United States Patent [19]

Klepper

[11] 3,857,678

[45] Dec. 31, 1974

[54] METHOD FOR DETERMINING TOXICITY OF PHYTOTOXINS IN PLANTS

[75] Inventor: Lowell A. Klepper, Lincoln, Nebr.

[73] Assignee: The United States of America as represented by the Secretary of Agriculture, Washington, D.C.

[22] Filed: Feb. 21, 1973

[21] Appl. No.: 334,343

[52] U.S. Cl.................... 23/230 R, 71/79, 252/408
[51] Int. Cl...... A01n 9/00, C09k 3/00, G01n 33/00
[58] Field of Search.................. 23/230 R; 252/408; 47/58 (U.S. only)

[56] References Cited
UNITED STATES PATENTS
3,544,303  12/1970  Swidler et al.................. 252/408 X

OTHER PUBLICATIONS

L. J. Audus, "The Physiology and Biochemistry of Herbicides," p. 53–74 (1964).

Primary Examiner—Joseph Scovronek

[57] ABSTRACT

A simple method is disclosed in which a plant's natural process of nitrate reduction is used to determine phytotoxic activity of compositions suspected of being herbicides. The basic technique can measure mode and extent of action, specificity, and application levels of most phytotoxic materials.

3 Claims, No Drawings

METHOD FOR DETERMINING TOXICITY OF PHYTOTOXINS IN PLANTS

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to a method of determining whether or not given compositions, such as herbicides, are phytotoxic (i.e., poisonous to plants).

Although herbicides have been widely used for the past two decades and are an integral part of agriculture production, many of their specific modes of action have remained an enigma. To date, researchers have been able to determine that some of the known herbicides kill by inhibiting photosynthesis, but the exact mechanism of this complex process remains unknown. One can only speculate on the phytotoxic mechanisms of the herbicides which do not appear to kill by photosynthetic inhibition. This lack of understanding has, thus far, prevented development of laboratory techniques for rapid identification of potential phototoxic compositions.

At the present time, the development of new compositions having phytotoxic activity must relay on procedures which require whole growing plants on which test compositions are sprayed or which require seedlings to be grown in soil to which the test compositions have been applied as pre-emergents. The times for test compositions applied in the above manner to be assimilated by the plant to an extent which destroys the plant can be from a day up to several weeks. These procedures also utilize considerable space.

According to the invention, I have discovered a method which requires only small amounts of leaf, stem, or root tissues and times that alloy one man to test as many as 100 compositions per day. The method for determining toxicity of phytotoxins in plants contains the following steps:

a. preparing an aqueous reaction mixture containing plant tissue, a phytotoxin, a compound selected from the group consisting of surfactants, ethanol, acetone, and isopropanol, and $KNO_3$ in amounts sufficient to produce detectable amounts of nitrite ion when treated as described in steps (b) and (c), infra, and $KH_2PO_4$ in an amount sufficient to buffer the reaction mixture at a pH of about 7.0;

b. vacuum infiltrating the reaction mixture;

c. incubating the reaction mixture at a temperature and light intensity sufficient to promote plant growth; and d. analyzing the incubated reaction mixture for the presence of nitrite ion.

The instant method provides a rapid screening method for newly synthesized and modified phytotoxic compositions which should result in widespread development of specific herbicides for specific plants. Since the method also functions when the phytotoxins are present within the plant tissue, a way is provided for determining effective application levels for both foliar and pre-emergent applications.

The procedure is also useful in studies relating to many physiological processes in plants and should promote further research into areas such as carbon dixoide fixation, nitrogen metabolism, and the electron flow of photosynthetic reactions.

DETAILED DESCRIPTION OF THE INVENTION

The basic method measures the mode and extent of action of phytotoxins, particularly herbicides, in live plant tissue by measuring nitrite ($NO_2^-$) accumulation in the reaction medium from plant tissue in the light after introduction of the phytotoxin into the tissue. Nitrite accumulation does not normally occur in plants since it is very toxic and is capable of reacting with and destroying a wide variety of compounds within the plant including proteins, enzymes, amines, chlorophyll, and plant hormones. Nitrites, which result from the reduction of nitrite ($NO_3^-$) by the enzyme nitrate reductase are normally further reduced to ammonia to eventually form amino acids. For a discussion of the nitrate to amino acid reduction, see *Plant Biochemistry* (ed. James Bonner and J. E. Varner), Academic Press, New York and London, 1965, pages 479–489.

Live tissue from any green plant containing chlorophyll and nitrate reductase and whose physiology depends upon photosynthesis is suitable for use in the method. Young leaf tissue taken from healthy plants actively growing in the light in nitrate-containing growth medium are preferred. However, tissue of other plant parts such as stems and roots are considered equivalent for the purpose of the invention. For the sake of convenience and availability, wheat, triticale, and soybean plants, grown in a nitrate-containing media, were chosen to supply the plant tissue used to test known herbicides according to the invention as exemplified below. However, other plants such as common mallow (*Malva neglecta*, Wallr.) and duckweed (*Lemna minor*, L.) were also used to successfully test the activity of phytotoxins. Plant tissue from mallow weed gave a positive nitrite accumulation when tested against 2,4-dichlorophenoxyacetic acid (2,4-D) and duckweed gave a positive nitrite accumulation when tested against the herbicide atrazine (2-chloro-4-ethylamino-6-isopropylamino-s-triazine) (see Example 5, infra).

There are two important variations of the basic method. First is the rapid screening (RS) assay in which the suspected phytotoxin is added directly to the reaction mixture containing plant tissue. The second variation is the simulated field condition (SFC) assay in which the suspected phytotoxin is applied to the growing plant, either as a pre-emergent (i.e., to the soil before the plant emerges) or as a foliar (i.e., to the plant after emergence) application, after which tissue from the treated plant is placed in the reaction mixture. The only basic difference, then, between the two variations is that the composition which is being tested for phytotoxic acitivity is in solution in the RS assay and is contained in the plant tissue in the SFC assay. Phytotoxins tested by the RS assay must enter the plant tissue artificially before the toxic effect occurs. Therefore, at this point the two variations become identical.

Known herbicides can be grouped into two major categories: those that act by directly inhibiting photosynthesis (type A); and those whose mode of action heretofore has been unknown (type B). Type A herbicides, which include the -aminotriazine, urea, and -uracil derivatives (see Table 1) apparently block the normal reduction of nitrite in the light, thereby causing the accumulation of this toxic material in the plant. Herbicides in the type B category, which includes phenoxy-, benzoic-, amide-, carbamate-, and triazole- derivatives (see Table 2), apparently are converted by plant metabolism (see Table 7) to form compounds which then block the normal reduction of nitrite in the light, thereby causing the accumulation of toxic nitrite. It is therefore necessary, when testing type B herbicides, to extend incubation times to allow this conversion to take place. Conversion of type B herbicides into inhibitors is stimulated by the addition of amino acids to the reaction medium. Amounts of phytotoxins must be determined for each phytotoxin-plant combination.

The use of surfactants (defined herein as "substances which alter the surface tension of water") in the Rs assay reaction mixture depends mostly on the particular phytotoxin being tested. Some compounds will be absorbed into the plant tissue with no surfactants when vacuum infiltration is used, and some compounds will be absorbed without surfactants and without vacuum infiltration (see Table 5).

While it is necessary in some, it is preferred that a surfactant be used in all SFC assays because their use increases the amount of nitrite available in solution after incubation. The use of surfactants must be checked for every species of plant used. In the RS assay for conversion of type B herbicides into inhibitors, the concentration of surfactant for optimum nitrite accumulation often interfers with the conversion process. Therefore, surfactant should not be used in reactions where they are found to interfere. It has been previously shown that nitrite accumulates in plant tissue when the tissue is incubated in the dark [Klepper et al., Plant Physiol. 48: 580–590 (1971)]. Results described in Example 10, infra, show that the addition of surfactants significantly increased the amount of nitrite that can be detected.

The use of particular surfactants depends somewhat on the plant specie that is being used to test the phytotoxins. Example 10 is also a description of the manner in which the best surfactant can be determined for any plant species. Optimum amounts of surfactant can also be determined in the same way. Certain plant species such as soybean do not respond to any surfactant tested. However, when the RS assay reaction mixture was made up in an aqueous ethanol solution, the amounts of nitrite accumulated in soybean leaf tissue were much higher than in wheat leaf tissue incubated in an RS assay reaction mixture made up in an aqueous surfactant solution. Acetone and isopropanol were also found to act in the same manner as ethanol when used in the Rs assay with soybean leaf tissue. The conditions under which ethanol, acetone, and isopropanol should be used to replace surfactants can also be determined in the manner described in Example 10.

The necessity of adding nitrates to the reaction mixture is also dependent on plant species and age of plant tissue. Some plant tissue, such as young soybean leaves or wheat leaves, contain sufficient nitrite to be reduced to detectable amounts of nitrite, and certain type B herbicides (e.g., 2,4–D) (see Table 4) applied to growing plants cause an accumulation of nitrite in the tissue large enough to be detected without incubation. However, since some plant tissue does not contain sufficient nitrate, it is preferred that nitrate be present in all assay reaction mixtures, especially when nitrite is measured quantitatively. Amounts of nitrate from 0 to 0.2 M have been used according to the invention to produce measurable amounts of nitrite. Nitrite is preferably added to the reaction mixture as the potassium salt. Optimum nitrate levels must also be determined for each plant specie. However, the use of other nitrate compounds will be obvious to those skilled in the art.

Photosynthesis, glycolysis, and nitrate reduction require the presence of phosphates. Most plant tissues contain phosphate in sufficient amounts for the enzymatic reactions requiring them to take place during the assay's incubation period. However, it is because phosphates are a natural ingredient of the plant tissues that $KH_2PO_4$ is the preferred buffering compound to maintain the pH of the reaction mixture at about 7. It will be known to those skilled in the art that many other buffering systems will be equivalent for the purpose of the invention.

The next step after the preparation of the reaction mixture containing plant tissue and phytotoxin is usually vacuum infiltration (28 inch of Hg). However, as described above, if the purpose of the test is to determine the absorptability of the phytotoxin or the effectiveness of the surfactant, vacuum infiltration is not performed. The purpose of this step is to infiltrate the plant tissue with reaction mixture so that maximum reaction is quickly achieved. This is accomplished by placing the reaction mixture under vacuum for a short time (usually to the point where the solution begins to boil), then releasing the vacuum. If the tissue continues to float, the process is repeated.

Incubation of the reaction mixture is defined as the promotion of the photosynthetic process within the plant tissue and involves both light and temperature. Any light having a wavelength and intensity sufficient to promote plant growth will drive the photosynthetic processes of the plant tissue contained in the reaction mixture, including the reduction of nitrite to ammonia. The range of light intensities considered to be sufficient for plant growth is from 5 to 10 $\mu$ einsteins·$m^{-2}$·$sec^{-1}$ for light having a wavelength of 750 m$\mu$ to 636 to 1,200 $\mu$ einsteins·$m^{-2}$·$sec^{-1}$ for light having a wavelength of 395 m$\mu$. Light having wavelengths between 395 m$\mu$ to 750 m$\mu$ is considered to be required for plant growth. The range of temperature suitable for plant growth is generally considered to be from about 20° to 40° C.

The final step of the assay is the determination of accumulated nitrite which is usually accomplished by reacting the nitrite ions in the reaction mixture with substances which give specific color change.

Visual determinations can be made in this way when a qualitative measure is sufficient, or the reactions can be quantified by titration or by optical density measurement. The preferred method is based on diazotization of a primary amine, and the reaction of the resulting diazonium salt with phenols to form highly colored products whose optical densities are readily measured with a colorimeter [see Evans et al., Plant Physiol. 28(2): 234–254 (April 1953)].

The assay procedure and method of detection as outlined above is sufficiently simple and rapid to lend itself to the easy determination of the different parameters encountered when testing the large variety of plants and phytotoxin available to those skilled in the art. Only limited amounts of experimentation are required to determine such parameters as amounts of plant tissue, phytotoxin, and nitrate, types and amounts of surfactants, specific amino acids to be added, intensities of light, and lengths of incubation necessary for each combination of plant and phytotoxin.

The following is intended as a general example of an entire procedure for determining the effectiveness of a suspected phytotoxin: A reaction mixture containing leaf sections (0.5–1 cm.$^2$) of young wheat plants (wheat is easy and quick to grow under laboratory conditions) is prepared, an amount of suspected phytotoxin is added to the mixture. The total mixture is vacuum infiltrated and incubated for 1 hour or more in the light at 30°–33° C. A color-developing solution consisting of sulfanilamide, α-naphthylethylenediamine-diHCl, and hydrochloric acid is added to the incubated mixture. If color develops, nitrite reduction has been inhibited. At this point the phytotoxin can be assayed with and without surfactant and vacuum infiltration to see if it can penetrate the plant tissues by itself.

Once the test material is established as a phytotoxin and the type has been determined, it is tested for activity against a variety of plant species to determine its specificity. Various plants are grown in vermiculite with a nitrate-containing nutrient medium. Herbicides are applied to the surface of the vermiculite before the emergence of seedlings in one test and to the foliage of young plants in another test. Leaves from the plants of both tests are then assayed for nitrite accumulation. These tests determine the proper methods of application. By proper application of varying amounts of phytotoxins, optimum dosage levels are determined which kill unwanted weeds without significantly affecting the desired plants.

The following examples are intended only to further illustrate the invention and are not meant to affect the scope of the claims.

EXAMPLE 1

Rapid screening assay for photosynthetic inhibitors (type A)
Plant tissue

Wheat and soybean plants were grown in a growth chamber (16 hours light, 700 μ einsteins·m$^{-2}$.sec$^{-1}$, 28° C., and 8 hours dark, 20° C.) in vermiculite and subirrigated daily with a nutrient media containing the following constituents:

| In millimolar concentrations | | In micromolar concentrations | |
|---|---|---|---|
| Ca(NO$_3$)$_2$ | − 5 | H$_3$BO$_3$ | − 23 |
| KH$_2$PO$_4$ | − 2 | MnCl$_2$ | − 46 |
| MgCl$_2$ | − 3 | ZnSO$_4$ | − 15 |
| (NH$_4$)$_2$SO$_4$ | − 2 | CuSO$_4$ | − 1.6 |
| KNO$_3$ | − 5 | H$_3$MoO$_4$ | − 0.7 |
| 330 Fe | − 0.05 | | |

Ph of solution adjusted to 5.5 with H$_2$SO$_4$.
Reaction mixtures

Aqueous reaction mixtures for wheat leaves were prepared having the following constituents:
0.09–0.1 percent by weight alkylpolyoxyether surfactant
0.07–0.075 percent by weight polyglycol ether surfactant
0.01 M KNO$_3$
0.05 M KH$_2$PO$_4$ (pH 7 buffer).

An aqueous reaction mixture for soybean leaves is the same as for wheat leaves with the exception that the surfactants are replaced by making up the solution in aqueous 4 percent ethanol (by volume).
Stock solutions of photosynthetic-inhibiting herbicides Solutions of known herbicides having concentrations of 0.1 mg./ml. were made up in the appropriate reaction media dependent upon plant specie.
Procedure Young plant tissue (from 5 to 12 days) was cut into sections of from 0.5 to 2.0 cm$^2$, weighed (0.25–0.50 g.), and placed in 50-ml glass beakers. Five milliliters of reaction mixture containing the herbicide solution were added to the plant tissue. Control analyses contained no herbicide in the reaction mixture. The beakers and their contents were placed under vacuum (approximately 28 inches of Hg) for 15 to 30 seconds, or until the reaction mixtures begin to boil vigorously and the vacuum released. The infiltration procedure was repeated once again. The reaction mixtures were then incubated at 30° to 35° C. for 60 minutes under a light of 300–400 μ einsteins·m$^{-2}$·sec$^{-1}$. The reaction was stopped by the addition of 2 ml. of an aqueous mixture containing 0.125 g./ml. HCl, 0.02 g./ml. sulfanilamide, and 0.0002 g./ml. α-naphthylethylenediamine-diHCl. A measured aliquot of the reaction mixture was made up to 4 ml. with water and its optical density determined at a wavelength of 540 mμ in a colorimeter. Concentrations of nitrite were determined by comparing the optical densities of the test solutions to a previously prepared standard concentration curve and compared to a control containing no herbicide and a control containing no herbicide which was incubated in the dark. Nitrite accumulation was measured as μmoles NO$_2^-$/gram fresh weight (gfw)/hour or total μmoles NO$_2^-$ accumulated/gfw. The comparison of accumulated NO$_2^-$ divided by the NO$_2^-$ accumulation in the dark gives percentage of total nitrite reduction inhibition (% inhib.) exhibited by the herbicide. Eleven known photosynthetic-inhibiting herbicides were tested in this manner, Table 1.

Table 1

| | Nitrite accumulation | | | |
|---|---|---|---|---|
| | Wheat leaves, | | Soybean leaves, | |
| Herbicide | μmoles/ gfw/hour | % Inhib. | μmoles/ gfw/hour | % Inhib. |
| 3',4'-dichloro-2-methacrylanilide | 2.6 | 100 | 5.7 | 37 |
| 3'-chloro-2-methyl-p-valerotoluidide | 1.6 | 62 | 5.3 | 35 |
| 2-ethylamino-4-isopropylamino-6-methylmercapto-s-triazine | 2.5 | 96 | 4.8 | 31 |
| 3-(p-chlorophenyl)-1,1-dimethylurea | 1.3 | 50 | 7.4 | 48 |
| 2-methoxy-4,6-bis(isopropylamino)-s-triazine | 1.7 | 65 | 5.1 | 33 |
| 5-bromo-3-sec-butyl-6-methyluracil | 2.1 | 81 | 6.9 | 45 |
| 2-chloro-4,6-bis(ethylamino)-s-triazine | 2.0 | 77 | 5.1 | 33 |

Table 1—Continued

| Herbicide | Nitrite accumulation | | | |
|---|---|---|---|---|
| | Wheat leaves, μmoles/ gfw/hour | % Inhib. | Soybean leaves, μmoles/ gfw/hour | % Inhib. |
| 2-chloro-4-ethylamino-6-isopropylamino-s-triazine | 2.1 | 81 | 7.8 | 51 |
| 2-chloro-4,6-bis-isopropylamino-s-triazine | 1.9 | 73 | 5.0 | 35 |
| 3-(3,4-dichlorophenyl)-1-methoxy-1-methylurea | 2.4 | 92 | 4.8 | 31 |
| N'-4(4-chlorophenoxy)phenyl-N,N-dimethylurea | 2.1 | 81 | 4.1 | 27 |
| Control (no herbicide) | 0 | | 0.10 | |
| Control (no herbicide — dark incubation) | 2.6 | | 15.3 | |

EXAMPLE 2

Rapid screening assay for composition whose mode of action is not known (type B)

Eight known herbicides were tested in the same manner as those in Example 1 with the exceptions that the reaction mixture contained (in addition) 80 μmoles per milliliter of an equal molar mixture of glutamic acid, alanine, glycine, and arginine (20 μmoles each), that times of incubation were longer, that the reaction mixtures were made up in a 4 percent (by volume) aqueous ethanol solution, and that no surfactants were used (see Table 2).

EXAMPLE 3

Technique

Centurk wheat seeds were planted in plastic containers (approximately 1 ft.²) in vermiculite and watered with nutrient solution described in Example 1. The following day, 80 mg. 5-bromo-3-sec-butyl-6-methyluracil were applied as a suspension to the surface of the vermiculite in one container, and 40 mg. 2-chloro-4-ethylamino-6-isopropylamino-s-triazine to the surface of the vermiculite in a second container. A control container without herbicides was prepared and treated in the same manner as the test containers. All watering of the plants was done from the surface. Leaf tissue was sampled at 24-hour intervals, and analyzed for the inhibition of nitrite reduction in the light as described in Example 1 with the exception that the aqueous reaction mixture contained only surfactant and nitrate; no herbicide was added. The inhibition of nitrite reduction as demonstrated in this experiment was due only to the presence of herbicide within the leaf as taken up by the roots and translocated to the leaves as occurs during herbicide applications in the field (see Table 3).

Table 2

| Herbicide | Nitrite accumulation | | | |
|---|---|---|---|---|
| | Wheat (240 min.) μmoles/gfw/hour | % Inhib. | Soybeans (90 min.) μmoles/gfw/hour | % Inhib. |
| 2,4-dichlorophenoxyacetic acid | 4.23 | 12.5 | 2.80 | 10.7 |
| 2,4,5-trichlorophenoxyacetic acid | 2.93 | 8.7 | 19.40 | 74.3 |
| 5-propyl butylethylthiocarbamate | 0.78 | 2.3 | 20.50 | 78.5 |
| 2,4-dichloro-3-nitro-benzoic acid | 1.40 | 4.2 | 6.00 | 23.0 |
| 2-chloro-2',6'-diethyl-N-(methoxymethyl) acetanilide | 1.40 | 4.2 | 3.50 | 13.4 |
| 1,1'-dimethyl-4,4'-bipyridinium | 2.65 | 7.9 | 6.03 | 23.1 |
| 3-amino-1,2,4-triazole | 2.45 | 7.3 | 2.75 | 10.5 |
| Isopropyl N-phenyl carbamate | 4.75 | 14.1 | 14.90 | 57.0 |
| Control (no herbicide) | 1.53 | 4.5 | 1.70 | 6.5 |
| Control (no herbicide — dark incubation) | 33.70 | | 26.10 | |

Table 3

| | Days from planting | | | | | |
|---|---|---|---|---|---|---|
| | 4 | 5 | 6 | 7 | 8 | 9 |
| | (Nitrite accumulation μmoles NO$_2^-$/gfw/hour) | | | | | |
| Control (light) | 0 | 0 | 0 | 0 | 0 | 0 |
| Control (dark) | 3.54 | 4.88 | 4.94 | 3.02 | 5.15 | 1.82 |
| + 5-bromo-3-sec-butyl-6-methyluracil (light) | 1.69 | 1.94 | 1.43 | 0.56 | 0.94 | 0.16 |
| + 5-bromo-3-sec-butyl-6-methyluracil (dark) | 2.34 | 2.09 | 1.92 | 0.87 | 0.98 | 0.16 |
| % Inhib. by 5-bromo-3-sec-butyl-6-methyluracil | 69 | 89 | 74 | 64 | 96 | 100 |
| + 2-chloro-4-ethylamino-6-isopropylamino-s-triazine (light) | 0 | 0 | 0.13 | 0.43 | 0.42 | 0.07 |
| + 2-chloro-4-ethylamino-6-isopropylamino-s-triazine (dark) | 2.71 | 2.80 | 2.66 | 1.37 | 1.15 | 0.07 |
| % Inhib. by 2-chloro-4-ethylamino-6-isopropylamino-s-triazine | 0 | 0 | 5 | 31 | 37 | 100 |

EXAMPLE 4

Soybean plants (9-day-old) were grown in vermiculite with nitrate-containing nutrient media as described in Example 3. The foliage (area = 0.5 ft.$^2$) was sprayed with 20 ml. of a 1 percent commercial preparation of a 2,4-dichlorophenoxyacetic acid ester, and the plants were placed in a growth chamber in the light. Duplicate leaf samples of 1 g. (approximately seven leaflets) were sampled at hourly intervals and nitrite content was determined as in Example 3 (see Table 4).

Table 4

| Hours after spraying | m$\mu$ Moles NO$_2^-$ present/gfw leaves |
|---|---|
| 0 | 0 |
| 1 | 25 |
| 2 | 64 |
| 3 | 95 |
| 4 | 97 |
| 7 | 108 |

Epinasty was visible after 1½ hours; in 3 hours leaves were visibly wilted with brown, necrotic areas appearing. Also in 3 hours, a strong epinastic response was noted in every plant.

EXAMPLE 5

Leaf tissue from a variety of plants was treated with herbicides by the methods described in Examples 1 and 2. A strong positive color reaction was determined visually when the reaction was stopped as with the mixture of HCl, sulfanilamide, and $\alpha$-naphthylethylenediamine-diHCl as described in Example 1 (see Table 5).

Table 5

| Plant | Herbicide | Method of treatment |
|---|---|---|
| Duckweed | 2-chloro-4-ethylamino-6-isopropylamino-s-triazine | Example 1 |
| Mallow | 2-ethylamino-4-isopropylamino-6-methylmercapto-s-triazine | Example 1 |
| Catnip | ⎰3-(p-chlorophenyl)-1,1-dimethylurea | Example 1 |
|  | ⎱5-bromo-3-sec-butyl-6-methyluracil | Example 1 |
|  | ⎰2-ethylamino-4-isopropylamino-6-methylmercapto-3-triazine | Example 1 |
| Radish | 2-chloro-4-ethylamino-6-isopropylamino-s-triazine | Example 1 |
| Mallow | 2,4-dichlorophenoxyacetic acid | Example 2 |

EXAMPLE 6

Example 1 was repeated with four herbicides and field-grown wheat tissue with and without surfactant and with and without vacuum infiltration (vac. inf.) (see Table 6).

Table 6

| Herbicide | w/o Surfactant[1] | | with Surfactant[1] | |
|---|---|---|---|---|
|  | w/o Vac. inf. | with Vac. inf. | w/o Vac. inf. | with Vac. inf. |
| 2-chloro-4-ethylamino-6-isopropylamino-s-triazine | 0 | 0.15 | 0.16 | 0.71 |
| 2-methoxy-4,6-bis(isopropylamino)-s-triazine | 0 | 0.11 | 0.26 | 0.620 |
| 3-(p-chlorophenyl)-1,1-dimethylurea | 0 | 0.07 | 0.21 | 0.35 |
| 5-bromo-3-sec-butyl-6-methyluracil | 0 | 0.09 | 0.26 | 0.49 |

[1] All values are expressed as $\mu$moles NO$_2$ formed/gfw/hour under light conditions.

EXAMPLE 7

Example 1 was repeated with 0.2 mg./ml. N'-4(4-chlorophenoxy)phenyl-N,N-dimethylurea and various varieties of wheat tissue (see Table 7).

Table 7

| Variety | % Inhib. of nitrite reduction |
|---|---|
| Trapper | 78 |
| NB 69565 | 42 |
| NE 701132 | 81 |
| NE 701136 | 46 |
| Scout 66 | 68 |
| Trader | 56 |
| Scoutland | 91 |
| NE 3547 | 62 |
| Gage | 55 |
| NE 701134 | 53 |
| Centurk | 59 |
| Lancer | 56 |

EXAMPLE 8

Example 2 was repeated with triticale leaves, 2,4,5-trichlorophenoxyacetic acid, and various amino acids (see Table 8).

Table 8

| Treatment | NO$_2^-$ Accumulated in the light, $\mu$moles NO$_2^-$/gfw/hour |
|---|---|
| Control (nothing added) | 0 |
| Control + 2,4,5-T[1] | 0.06 |
| Control + 2,4,5-T + Glycine[2] | 0.73 |
| Control + 2,4,5-T + Serine | 0.72 |
| Control + 2,4,5-T + Alanine | 0.67 |
| Control + 2,4,5-T + Tyrosine | 0.27 |
| Control + 2,4,5-T + Leucine | 0.83 |
| Control + 2,4,5-T + Glutamate | 0.74 |
| Control + 2,4,5-T + Histidine | 0.26 |
| Control + 2,4,5-T + Proline | 0.84 |
| Control + 2,4,5-T + Threonine | 0.82 |
| Control + 2,4,5-T + Methionine | 0.82 |

Table 8—Continued

| Treatment | NO$_2^-$ Accumulated in the light, $\mu$moles NO$_2^-$/gfw/hour |
|---|---|
| Control + 2,4,5-T + Arginine | 0.86 |
| Control + 2,4,5-T + Lysine | 0.91 |
| Control + 2,4,5-T + Cystine | 0.88 |
| Control + 2,4,5-T + Valine | 0.90 |
| Control + 2,4,5-T + Aspartate | 0.81 |
| Control + 2,4,5-T + Asparagine | 0.67 |
| Control + 2,4,5-T + Isoleucine | 0.93 |
| Control + 2,4,5-T + Cysteine | 0.00 |
| Control + 2,4,5-T + Tryptophan | 0.88 |
| Control + 2,4,5-T + Phenylalanine | 0.93 |

[1] 2,4,5-trichlorophenoxyacetic acid.
[2] All amino acids included in reaction mixture at 40 $\mu$moles/ml.

EXAMPLE 9

Example 2 was repeated with wheat tissue with varying amounts of the amino acid mixture added to the reaction mixture (see Table 9).

Table 9

| | NO$_2^-$ Accumulated in the light, $\mu$moles NO$_2^-$/gfw/hour |
|---|---|
| 2,4,5-T[1] + zero amino acids[2] | 0.58 |
| 2,4,5-T + 8 $\mu$moles/ml. | 0.74 |
| 2,4,5-T + 16 $\mu$moles/ml. | 0.75 |
| 2,4,5-T + 24 $\mu$moles/ml. | 0.87 |
| 2,4,5-T + 40 $\mu$moles/ml. | 0.92 |
| 2,4,5-T + 80 $\mu$moles/ml. | 1.06 |

[1] 2,4,5-trichlorophenoxyacetic acid.
[2] Amino acid stock solution consisted of equal molar content of glutamic acid, alanine, glycine, and arginine.

EXAMPLE 10

Example 2 was repeated using 9-day old soybean leaves and various concentrations of 2,4,5-trichlorophenoxyacetic acid (see Table 10).

Table 10

| Concentration of 2,4,5-T[1] | $\mu$Moles NO$_2^-$/gfw/hour |
|---|---|
| 0.36 mg./ml. | 4.03 |
| 0.036 mg./ml. | 3.47 |
| 0.0036 mg./ml. | 1.34 |
| 0.00036 mg./ml. | 1.12 |
| 0 | 0.56 |

[1] 2,4,5-trichlorophenoxyacetic acid.

EXAMPLE 11

Leaf tissue from wheat, corn, and triticale were incubated in the dark for 1 hour in the wheat reaction mixture described in Example 1 with the exception that the surfactants were replaced by equivalent amounts of various individual commercially available surfactants. The incubated mixtures were analyzed as described in Example 1 (see Table 11).

Table 11

| | $\mu$Moles NO$_2^-$ detected/gfw/hour | | | | |
|---|---|---|---|---|---|
| | Wheat | | Corn | | Triticale |
| | Centurk | Scout 66 | NE611 | PN132 | Beaver-Arm"'s" |
| Polyglycol ether A | 4.0 | 4.0 | 1.0 | 3.0 | 2.4 |
| Polyglycol ether B | 3.6 | 3.9 | 0.9 | 2.4 | 2.4 |
| Alkylpolyoxyether | 6.4 | 6.2 | 1.4 | 5.2 | 4.7 |
| Nonylphenol polyethoxyethanol | 4.6 | 4.7 | 0.9 | 2.8 | 2.8 |
| Polyalkylene glycol ether | 4.6 | 4.1 | 1.1 | 3.0 | 3.6 |
| Alkylolamide | 0.9 | 1.0 | 0.8 | 0.7 | 0.7 |
| Polyoxyethylene ethanol | 0.9 | 1.0 | 0.7 | 0.6 | 0.9 |
| Octylphenyl polyether alcohol | 4.6 | 4.4 | 1.3 | 2.5 | 2.8 |
| Control (no surfactant) | 0.6 | 0.5 | 0.5 | 0.4 | 0.5 |

I claim:

1. A method for determining toxicity of phytotoxins in plants comprising the steps of:
    a. preparing an aqueous reaction mixture containing plant tissue, a phytotoxin, a compound selected from the group consisting of surfactants, ethanol, acetone, and isopropanol, and KNO$_3$ in amounts sufficient to produce detectable amounts of nitrite ion when treated as described in steps (b) and (c), infra, and KH$_2$PO$_4$ in an amount sufficient to buffer the reaction mixture at a pH of about 7.0;
    b. vacuum infiltrating the reaction mixture;
    c. incubating the reaction mixture at a temperature and light intensity sufficient to promote plant growth for a time sufficient to produce detectable amounts of nitrite; and
    d. analyzing the incubated reaction mixture for the presence of nitrite ion.

2. A method for determining toxicity of phytotoxins in plants as described in claim 1 in which the plant tissue contains phytotoxin previously absorbed by the plant during original growth.

3. A method for determining toxicity of phytotoxins in plants comprising the steps of:
    a. preparing an aqueous reaction mixture of plant tissue, and a solution containing a phytotoxin, a compound selected from the group consisting of surfactants, ethanol, acetone, and isopropanol, and KNO$_3$ in amounts sufficient to produce detectable amounts of nitrite ion when treated as described in steps (b) and (c), infra, and KH$_2$PO$_4$ in an amount sufficient to buffer the reaction mixture at a pH of about 7.0;
    b. incubating the reaction mixture at a temperature and light intensity sufficient to promote plant growth for a time sufficient to produce detectable amounts of nitrite; and
    c. analyzing the incubated reaction mixture for the presence of nitrite ion.

* * * * *